US 6,721,469 B2

(12) United States Patent
Kopp et al.

(10) Patent No.: US 6,721,469 B2
(45) Date of Patent: Apr. 13, 2004

(54) CHIRAL IN-FIBER ADJUSTABLE POLARIZER APPARATUS AND METHOD

(75) Inventors: Victor Il'ich Kopp, Flushing, NY (US); Azriel Zelig Genack, New York, NY (US)

(73) Assignee: Chiral Photonics, Inc., Clifton, NJ (US)

( * ) Notice: Subject to any disclaimer, the term of this patent is extended or adjusted under 35 U.S.C. 154(b) by 0 days.

(21) Appl. No.: 10/313,450

(22) Filed: Dec. 6, 2002

(65) Prior Publication Data

US 2003/0118265 A1 Jun. 26, 2003

Related U.S. Application Data

(60) Provisional application No. 60/338,345, filed on Dec. 6, 2001.

(51) Int. Cl.[7] .................................................. G02B 6/00
(52) U.S. Cl. .............................. 385/11; 385/24; 385/10; 385/123
(58) Field of Search ............................. 385/24, 10, 123

(56) References Cited

U.S. PATENT DOCUMENTS 5,452,394 A * 9/1995 Huang ........................ 385/123
6,181,465 B1 * 1/2001 Grubb et al. ................ 359/337
6,229,937 B1 * 5/2001 Nolan et al. .................. 385/24

OTHER PUBLICATIONS

Hecht, Understanding Fiber Optics, 1999, Prentice–Hall, Third Edition, pp. 130–135.*

* cited by examiner

Primary Examiner—Hemang Sanghavi
Assistant Examiner—Eric Wong
(74) Attorney, Agent, or Firm—Edward Etkin, Esq.

(57) ABSTRACT

A chiral in-fiber tunable polarizer implemented in a chiral fiber structure is provided. The chiral fiber is selected with a predetermined handedness and scatters (by reflecting, coupling into the fiber core or otherwise) the circularly polarized light matching its handedness while transmitting circularly polarized light of opposite handedness. By combining the chiral fiber with another fiber component having a non-cylindrical core, the inventive apparatus produces a linearly polarized wave with a predetermined orientation. The orientation may be adjusted by rotating the fiber component around its central axis. The chiral fiber structure may be configured as a long period chiral fiber grating. Optionally, the chiral fiber structure may be configured with a variable pitch along its length, such as a chirped fiber grating, an apodized fiber grating, or a set of multiple sequential chiral polarizer elements with different pitches. This variable pitch arrangement results in output light having a configurable polarization spectrum of a predetermined shape.

7 Claims, 2 Drawing Sheets

CHIRAL IN-FIBER ADJUSTABLE POLARIZER APPARATUS AND METHOD

CROSS REFERENCE TO RELATED APPLICATIONS

The present patent application claims priority from the commonly assigned U.S. provisional patent application Ser. No. 60/338,345 entitled "Chiral In-Fiber Adjustable Polarizer Apparatus and Method" filed Dec. 6, 2001.

FIELD OF THE INVENTION

The present invention relates generally to polarizers, and more particularly to a frequency selective polarizer based on a chiral optical fiber.

BACKGROUND OF THE INVENTION

Any device that requires polarized light uses one or more polarizers. Polarizers have many industrial applications. For example, polarizers may be utilized in electro-optic modulators and laser subsystems. Of particular interest is the use of polarizers as in-line modules in optical fibers. Previously known in-line polarizers typically comprise an assembly with a first lens following a first optical fiber for collimating the light emerging from the fiber. The collimated light then passes though a polarizer plate and is then focused by a second lens into a second optical fiber. The main disadvantage of this type of polarizer is that it is relatively expensive and difficult to construct. Furthermore, the lens-based polarizer interrupts the optical fiber leading to optical loss. Finally, the lens-based polarizer introduces a device into the fiber that is larger than the fiber, thereby causing potential space and size problems.

One attempt to solve the above problems resulted in the development of another in-line fiber polarizer that was constructed by wrapping the optical fiber in several loops around a circular member before allowing the fiber to continue on its way. This arrangement eliminated some of the drawbacks of the previously known lens-based polarizer—for example this was a true in-line device that did not interrupt the fiber, and it was not expensive to manufacture. However, the coil-based polarizer suffered from another significant drawback—the coil element around which the fiber needed to be wrapped was typically many centimeters in diameter making the coil-based polarizer very bulky and difficult or impossible to use in many applications.

Finally, none of the previously known polarizers were easily adjustable—changing the orientation of the resulting polarized light required re-configuration of the polarizer device.

It would thus be desirable to provide an in-line polarizer with low insertion loss that does not interrupt an optical fiber with a larger structure. It would also be desirable to provide an in-line polarizer that is inexpensive and easy to fabricate. It would further be desirable to provide an in-line polarizer than enables selective tuning of the orientation of the polarized light.

SUMMARY OF THE INVENTION

Figure 1A:
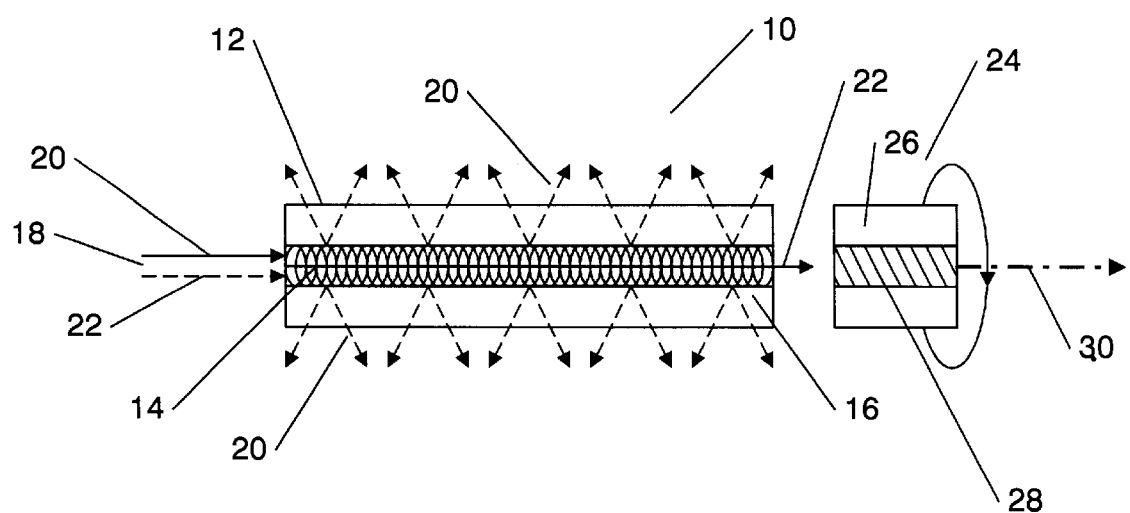
FIG. 1A is a schematic diagram of a side view of a first embodiment of the chiral in-fiber tunable polarizer of the present invention.

The present invention is directed to a novel chiral in-fiber polarizer that is based on a specially configured optical chiral fiber structure for example having advantageous optical properties similar to a cholesteric liquid crystal (CLC) structure. The chiral fiber structure used in the inventive chiral in-fiber polarizer achieves optical properties similar to a CLC structure because it satisfies the requirement that in a CLC structure the pitch of the structure is twice its period. This is accomplished by using a chiral fiber structure having geometric birefringence with 180 degree symmetry. Such properties may be obtained by imposing two identical coaxial helixes along a fiber structure, where the second helix is shifted by half of the structure's pitch forward from the first helix. Such structures are described in greater detail in the co-pending commonly assigned U.S. Patent applications entitled "Apparatus and Method for Manufacturing Fiber Gratings", "Apparatus and Method of Manufacturing Helical Fiber Bragg Gratings", "Apparatus and Method for Fabricating Helical Fiber Bragg Gratings", "Helical Fiber Bragg Grating", and "Long Period Chiral Fiber Grating and, Apparatus and Method of Fabrication Thereof" which are hereby incorporated by reference herein in their entirety. Several embodiments of the inventive chiral in-fiber polarizer are discussed below.

A chiral in-fiber tunable polarized implemented in a chiral fiber structure is provided. The chiral fiber is selected with a predetermined handedness and scatters the circularly polarized light matching its handedness while transmitting circularly polarized light of opposite handedness. By combining the chiral fiber with another fiber component having a non-cylindrical core, the inventive apparatus produces a linearly polarized wave with a predetermined orientation. The orientation may be adjusted by rotating the fiber component around its central axis.

The first embodiment of the inventive chiral in-fiber tunable polarized comprises a chiral fiber structure. The chiral fiber structure may be configured as:

(1) a chiral fiber having a pitch that is substantially equal to wavelength of incident unpolarized light inside the structure (hereinafter $\lambda_F$), (2) a chiral fiber having a pitch that is longer than $\lambda_F$, but not of great enough magnitude to acquire long period grating properties, (3) a long period chiral fiber grating having a pitch that is significantly greater than $\lambda_F$, or (4) a chiral fiber having a variable pitch along its length such as:

(a) a chirped chiral fiber (as disclosed in a commonly assigned co-pending U.S. Patent application entitled "Customizable Chirped Chiral Fiber Bragg Grating" which is hereby incorporated by reference in its entirety), (b) an apodized chiral fiber (as disclosed in a commonly assigned co-pending U.S. provisional Patent application entitled "Customizable Apodized Chiral Fiber Grating" which is hereby incorporated by reference in its entirety), or (c) a collection of sequential chiral fiber elements (selected from one or more of the above types) each having a different pitch.

The chiral fiber structure configurations (4)(a–c) enable shaping of the polarization spectrum of the light wave exiting the chiral in-fiber polarizer into a desired form by selecting a particular sequence of chiral fiber elements.

The chiral fiber structure is selected with a predetermined handedness and scatters the circularly polarized light matching its handedness while transmitting circularly polarized light of opposite handedness, thus serving as an in-fiber polarizer. The exact method by which the scattering occurs depends on the type of chiral fiber structure selected, but invariably scattering results in removal of the circularly polarized light that matches the handedness of the chiral fiber structure from the forward propagating light wave.

In another embodiment of the invention, the chiral fiber polarizer includes a sequentially positioned optical fiber component having a non-cylindrical core. This enables the chiral polarizer to produce a linearly polarized wave with a predetermined orientation. The orientation may be adjusted by rotating the fiber component around its central axis.

In an alternate embodiment of the present invention, the chiral in-fiber polarizer may be configured as a chiral fiber laser having lasing output with tunable polarization. In this embodiment, the chiral fiber structure is doped with an active material, such as Erbium, and then optically pumped.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

The present invention is directed to an advantageous in-fiber tunable polarizer based on a chiral optical fiber. Before describing the inventive polarizer in greater detail, it would be advantageous to provide an explanation of the scientific principles behind chiral fibers. A chiral fiber is a novel structure that mimics cholesteric liquid crystal (CLC) properties—the cholesteric periodic photonic band gap structure—in a fiber form. A commonly assigned co-pending U.S. Patent Application entitled "Helical Fiber Bragg Grating" (hereinafter "HFBG")) which is hereby incorporated by reference in its entirety, disclosed the advantageous implementation of the essence of a cholesteric periodic photonic band gap (hereinafter "PBG") structure in an optical fiber. This novel approach captured the superior optical properties of cholesteric liquid crystals while facilitating the manufacture of the structure as a continuous (and thus easier to implement) process.

In order to accomplish this, the HFBG patent application taught that the inventive structure must mimic the essence of a conventional CLC structure—its longitudinal symmetry. A helical fiber structure appears to have the desired properties. However, in a CLC structure the pitch is twice the period. This is distinct from the simplest realization of the helical structure, which is a single helix. In the single helix structure, the period is equal to the pitch and one might expect to find the band gap centered at the wavelength equal to twice the period. However, this arrangement produces a mismatch between the orientation of the electric field of light passing through the structure and the symmetry of the helix. The field becomes rotated by 360 degrees at a distance equal to the wavelength of light of twice the pitch. On the other hand, the helix rotation in this distance is 720 degrees. Thus, while a helical structure has certain beneficial applications it does not truly mimic the desirable CLC structure with one notable exception—when the structure is composed of two different adjacent materials.

Thus, a structure that meets the requirements for producing a reflection band while preserving the advantages of a cholesteric structure must satisfy two requirements:
(1) that the period of the structure's optical dielectric susceptibility is half the wavelength, and
(2) the dielectric susceptibility of the structure rotates so that it is substantially aligned with the direction of the field of the circular polarized standing wave.

The HFBG patent application further taught that one of the most advantageous and simplest ways to construct a structure satisfying these requirements is to create a double helix structure. In this structure, two identical coaxial helixes are imposed in or on a fiber structure, where the second helix is shifted by half of the pitch forward from the first helix. Another advantageous structure satisfying these requirements, is a single helix structure that is composed of two adjacent components of different optical indexes joined together. In this case, the wavelength is equal to the pitch and the pitch is equal to twice the period of the effective optical dielectric susceptibility of the system. The HFBG patent application disclosed several embodiments of such advantageous double and single helix structures in optical fibers that may be fabricated as a matter of design choice. An advantageous apparatus and a method for fabricating double and single helix structures are disclosed in a commonly assigned co-pending provisional patent application entitled "Apparatus and Method for Manufacturing Helical Fiber Bragg Gratings" which is hereby incorporated by reference in its entirety.

While the chiral in-fiber tunable polarizer of the present invention is described with reference to the above-incorporated embodiments of inventive optical fibers having CLC-like optical properties derived from their helical or double helical structures, it should be noted that the inventive chiral in-fiber polarizer may be advantageously constructed utilizing any optical fiber having chiral properties regardless of how those properties are achieved. Furthermore, it should be noted that the various advantageous CLC-related techniques disclosed in the above-incorporated commonly assigned co-pending U.S. Patent Applications may be readily adapted to, and advantageously utilized in conjunction with, the inventive chiral polarizer as a matter of design choice without departing from the spirit of the invention.

The essence of the present invention is that a chiral optical fiber of a particular handedness (right or left) removes a forward propagating circularly polarized component of its own handedness from a light signal received from a conventional optical fiber, while transmitting the circularly polarized component of the other handedness without attenuation. This occurs over a broad range of wavelengths, centered at a wavelength which is shorter than those in the region of selective reflection. A chiral optical fiber may therefore advantageously serve as a broadband, in-fiber circular polarizer with potentially low insertion loss.

Figure 1B:
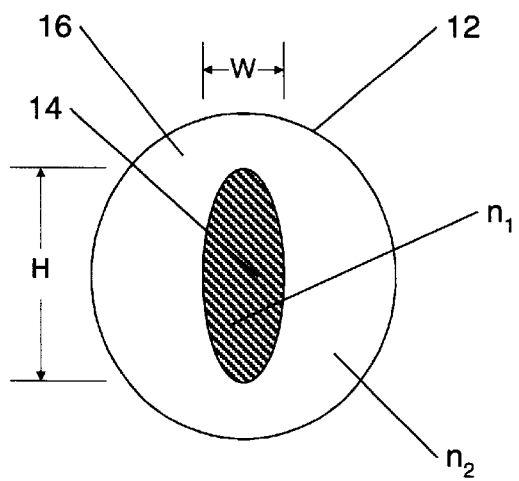
FIG. 1B is a schematic diagram of a cross-section view of a chiral fiber structure of the chiral in-fiber polarizer of FIG. 1.

Referring now to FIGS. 1A and 1B, a preferred embodiment of an inventive chiral in-fiber tunable polarizer 10 is shown. The chiral polarizer 10 comprises a chiral fiber structure 12 having an outer cladding 16 and an inner central core 14. Both the core 14 and the cladding 16 may be composed from a variety of optical materials (e.g. glass or plastic) having refractive indices n1 and n2, respectively, selected as a matter of design choice. In the exemplary embodiment shown in FIGS. 1A and 1B, in accordance with the HFBG patent application, the core 14 is twisted to form a double helix structure. The specific cross-section shape and size (height H and width W) of the core 14 may be selected as a matter of design choice as long as the base core 14 structure maintains 180 degree symmetry such that when it is twisted, a double helix structure is formed. As noted above, the core 14 may be any chiral structure, not just the one disclosed in the HFBG patent application—for example, the core 14 may be constructed by imposing double helix grooves on a cylindrical core, by wrapping the core with a dielectric material, or a combination of the two.

The handedness of the core 14 structure determines the polarization handedness of emerging light where—i.e. if the core 14 is a right handed chiral structure, left circularly polarized light will be transmitted. Thus, the handedness of the core 14 may be selected as a matter of design choice. Because the chiral polarizer 10 is essentially in the form of an optical fiber, it may be inserted advantageously into an optical fiber line without interrupting the line and without causing a change in the diameter of the fiber at the site of the chiral polarizer 10.

The chiral fiber structure 12 can be configured in a number of different arrangements:

(1) a chiral fiber having a pitch that is substantially equal to wavelength of incident unpolarized light inside the structure (hereinafter $\lambda_F$), (2) a chiral fiber having a pitch that is longer than $\lambda_F$, but not of great enough magnitude to acquire long period grating properties, (3) a long period chiral fiber grating having a pitch that is significantly greater than $\lambda_F$, or (4) a chiral fiber having a variable pitch along its length such as:

(a) a chirped chiral fiber, (b) an apodized chiral fiber, or (c) a collection of sequential chiral fiber elements (selected from one or more of the above types) each having a different pitch (described in greater detail below on connection with FIG. 2).

The chiral polarizer 10, where the chiral fiber structure 12 is configured with a right handed core 14, operates as follows. When incident unpolarized light 18, having a RCP component 20 and a LCP component 22, enters the chiral fiber structure 12 from a conventional optical fiber (not shown), the right handed chiral core 14 scatters the RCP light component 20 and allows the LCP component 22 to emerge from its other side, thereby polarizing the light. If the core 14 is constructed as a left handed structure, then RCP light would be transmitted and the LCP light would be scattered.

It should be noted that FIG. 1A shows a representative scattering arrangement of RCP light 20 only by way of example. The exact method by which the scattering of the polarized component of the same handedness as the chiral fiber structure 12 occurs depends on the type of chiral fiber structure 12 selected, but invariably scattering results in removal of the circularly polarized light matching the handedness of the chiral fiber structure 12 from the forward propagating light wave. For example, in the chiral fiber structure 12, arrangement (1), the RCP light component is scattered by being reflected back from the core 14, in the chiral fiber structure 12 arrangement (2), the RCP light component is scattered as shown in FIG. 1A, in the chiral fiber structure 12, arrangement (3), the RCP light component is scattered by transferring it from the core 14 into cladding 16, and in the chiral fiber structure 12, arrangements (4) (a–c), the RCP light component is scattered in a manner depending on the pitch variation along the chiral fiber structure 12.

Optionally, the chiral polarizer 10 may include an additional polarization/tuning component 24. The component 24 comprises a short fiber having a cladding 26 and core 28 having a non-cylindrical cross section. However, unlike the core 14, the core 28 is not twisted or otherwise modified, and thus the component 24 is not a chiral fiber. The component 24 is preferably positioned in contact with the end of the chiral fiber 14 (it is shown in FIG. 1A as being apart from the end point of the chiral fiber structure 12 for the sake of clarity) and serves as a quarter-wave plate to convert the emerging LCP light (or RCP light if the chiral fiber structure 12 is configured as a left handed structure) into linearly polarized light 30, having an orientation depending on the axial position of the component 24. Thus, the component 24 may be tuned to enable the chiral polarizer 10 to advantageously produce linearly polarized light of any desirable orientation. As component 24 is rotated around its axis by an angle θ, the orientation of the linear polarized light 30 is likewise rotated by the same angle θ.

Utilization of a chirped or apodized chiral fiber as a chiral fiber structure 12 may be advantageous in some applications because the pitch of a chirped or apodized chiral fiber structure varies along its length. This enables shaping of the polarization spectrum of the resulting light 30 into a desirable form by selecting a pitch variation corresponding to the desirable spectrum shape. The same objective may also be accomplished in chiral fiber structure arrangement (4)(c) by using two or more sequential chiral fiber elements having different pitches (and in addition the chiral fiber elements may themselves be chirped or apodized chiral fibers).

Figure 2:
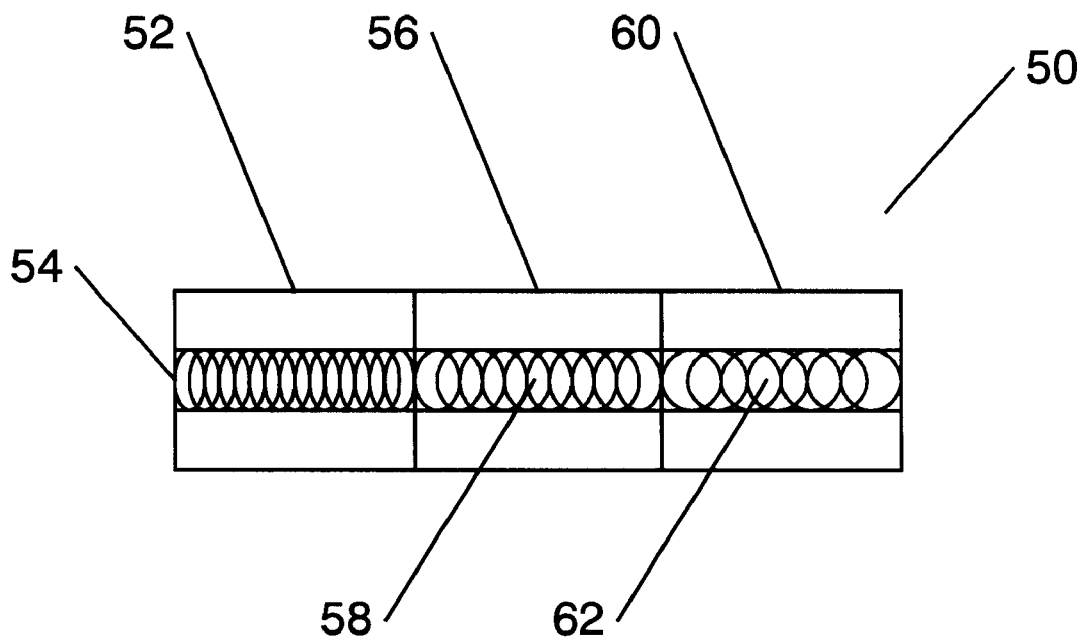
FIG. 2 is a is a schematic diagram of a side view of a second embodiment of the chiral in-fiber tunable polarizer of the present invention utilizing multiple chiral in-fiber polarizing elements.

Referring now to FIG. 2 an exemplary arrangement (4)(c) of the chiral fiber structure 12 is shown as a chiral fiber structure 50. The chiral fiber structure 50 comprises three sequential chiral fiber elements 52, 56, and 60, with respective cores 54, 56, 62, each having a different pitch. It should be understood that the number of chiral fiber elements used may range from two and up and that identical pitches may repeat throughout a structure 50 having three or more chiral fiber elements. The number of chiral fiber elements, the pitches of the elements and their sequence may be selected as a matter of design choice without departing from the spirit of the invention.

In another embodiment of the present invention, the chiral polarizer 10 may be used as a chiral fiber laser described in a co-pending commonly assigned U.S. patent application entitled "Chiral Fiber Laser Apparatus and Method" which is hereby incorporated by reference in its entirety. In this embodiment the chiral fiber 12 is doped with an active material, such as Erbium, and then optically pumped (not shown). This will advantageously produce lasing from the polarizer 12 with a predetermined desirable (and adjustable) polarization.

The chiral polarizer 10 thus addresses all of the disadvantages of the previously known in-line polarizers because it is easy and inexpensive to fabricate, minimizes the insertion loss, and does not change the size of the optical fiber in which it is used. Finally, the optional component 24 enables the polarizer 10 to be advantageously tuned.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A chiral polarizer comprising:

an elongated chiral optical fiber being of a predetermined handedness said chiral optical fiber having a core disposed along its longitudinal axis and a cladding surrounding said core, said chiral optical fiber having a first end and a second end, and having at least one predetermined pitch between said first and said second ends, wherein said at least one predetermined pitch is sufficiently short such that, when incident unpolarized light having a first circularly polarized component and a second circularly polarized component, enters said first end, said core scatters one of said first and second circularly polarized components that matches said predetermined handedness, and transmits the other circularly polarized component through said second end, thus polarizing said incident light into circularly polarized light having an opposite handedness to said predetermined handedness.

2. The chiral polarizer of claim 1, wherein said predetermined handedness is one of: right handed and left handed, and wherein said first circularly polarized component is a right circularly polarized component and said second circularly polarized component is a left circularly polarized component.

3. The chiral polarizer of claim 1, further comprising a polarization adjusting means, positioned at said second end, for changing said circularly polarized light into linearly polarized light and for adjusting orientation of said linearly polarized light to a desired selected value.

4. The chiral polarizer of claim 3, wherein said polarization adjusting means comprises an elongated optical fiber component having a central longitudinal axis, a second core with a non-cylindrical cross-section, and a second cladding surrounding said second core, and wherein said elongated optical fiber component functions substantially as a quarter wave plate, such that when said fiber component is rotated around its longitudinal axis by a predetermined angle of rotation, orientation of said linearly polarized light is thereby changed in proportion to said angle of rotation.

5. The chiral polarizer of claim 1, wherein said chiral optical fiber comprises at least one chiral fiber element selected from the following group of: a chiral fiber element having said at least one predetermined pitch that is substantially equal to a wavelength of said incident unpolarized light inside said chiral optical fiber, a long period grating chiral fiber element having said at least one predetermined pitch that is substantially equal to a long period grating pitch, a chiral fiber element having said at least one predetermined pitch that is greater than said center wavelength but less than said long period grating pitch, a chirped chiral fiber grating element having said at least one predetermined pitch that is substantially equal to a chirped pitch, and an apodized chiral fiber grating element having said at least one predetermined pitch that is substantially equal to an apodized pitch.

6. The chiral polarizer of claim 5, wherein said chiral optical fiber comprises at least two sequentially positioned chiral fiber elements selected from said group.

7. A method for polarizing light implemented in a chiral structure, comprising the steps of:

(a) providing an elongated chiral optical fiber being of a predetermined handedness, the chiral optical fiber having a core disposed along the longitudinal axis and a cladding surrounding said core, said chiral optical fiber having a first end and a second end, and having at least one predetermined pitch between said first and said second ends, wherein said at least one predetermined pitch is sufficiently short, such that when incident unpolarized light having a first circularly polarized component and a second circularly polarized component, enters said first end, said core scatters one of said first and second circularly polarized components that matches said predetermined handedness, and transmits the other circularly polarized component through said second end;

(b) positioning an elongated optical fiber component having a central longitudinal axis, a second core with a non-cylindrical cross-section, and a second cladding surrounding said second core, at said second end to convert said other circularly polarized component into linearly polarized light; and (c) rotating said component around its central longitudinal axis to selectively determine an orientation for said linearly polarized light.

* * * * *